United States Patent
Zimmermann et al.

(10) Patent No.: US 12,113,688 B2
(45) Date of Patent: *Oct. 8, 2024

(54) NON-INTRUSIVE IT DEVICE MONITORING AND PERFORMING ACTION BASED ON IT DEVICE STATE

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE SYSTEMS, INC., Fremont, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/347,475

(22) Filed: Jun. 14, 2021

(65) Prior Publication Data
US 2021/0306242 A1 Sep. 30, 2021

Related U.S. Application Data

(63) Continuation of application No. 14/947,834, filed on Nov. 20, 2015, now Pat. No. 11,057,285.

(60) Provisional application No. 62/083,622, filed on Nov. 24, 2014.

(51) Int. Cl.
| | | |
|---|---|---|
| *H04L 43/0817* | (2022.01) | |
| *G06F 9/455* | (2018.01) | |
| *H04L 41/0213* | (2022.01) | |
| *H04L 41/046* | (2022.01) | |
| *H04L 41/0681* | (2022.01) | |
| *H04L 41/082* | (2022.01) | |
| *H04L 41/12* | (2022.01) | |
| *H04L 43/0811* | (2022.01) | |
| *H04L 67/10* | (2022.01) | |

(52) U.S. Cl.
CPC ...... *H04L 43/0817* (2013.01); *G06F 9/45558* (2013.01); *H04L 41/12* (2013.01); *H04L 67/10* (2013.01); *G06F 2009/45591* (2013.01); *H04L 41/0213* (2013.01); *H04L 41/048* (2013.01); *H04L 41/0681* (2013.01); *H04L 41/082* (2013.01); *H04L 43/0811* (2013.01)

(58) Field of Classification Search
CPC ..... H04L 43/0817; H04L 41/12; H04L 67/10; H04L 41/0213; H04L 41/048; H04L 41/0681; H04L 41/082; H04L 43/0811; G06F 9/45558; G06F 2009/45591
See application file for complete search history.

(56) References Cited

U.S. PATENT DOCUMENTS

| | | | | |
|---|---|---|---|---|
| 11,540,148 | B2 * | 12/2022 | Stafford | H04W 16/20 |
| 2003/0218633 | A1 * | 11/2003 | Mikhail | G06F 9/542 |
| | | | | 707/E17.117 |
| 2003/0220989 | A1 * | 11/2003 | Tsuji | G06F 16/9574 |
| | | | | 707/E17.12 |
| 2003/0221068 | A1 * | 11/2003 | Tsuji | G06F 16/284 |
| | | | | 711/126 |
| 2007/0294368 | A1 * | 12/2007 | Bomgaars | H04L 41/50 |
| | | | | 709/217 |

(Continued)

*Primary Examiner* — Ninos Donabed
(74) *Attorney, Agent, or Firm* — HORIZON IP PTE LTD.

(57) ABSTRACT

Infrastructure management device(s) may monitor IT device(s) communicatively connected over a network. IT device state(s) may be determined for at least one of the IT device(s). Action(s) may be performed on one or more IT device(s), determined at least in part, by the state of the IT device(s).

17 Claims, 7 Drawing Sheets

(56) References Cited

U.S. PATENT DOCUMENTS

| | | | |
|---|---|---|---|
| 2011/0225230 A1* | 9/2011 | Russ | H04L 69/163 709/224 |
| 2011/0320544 A1* | 12/2011 | Yee | H04L 43/10 709/228 |
| 2012/0011567 A1* | 1/2012 | Cronk | H04N 21/25816 726/28 |
| 2013/0060912 A1* | 3/2013 | Rensin | H04L 67/14 709/219 |
| 2014/0064151 A1* | 3/2014 | Shaik | H04M 15/83 370/259 |
| 2014/0066004 A1* | 3/2014 | Shaik | H04L 12/1407 455/406 |
| 2014/0233384 A1* | 8/2014 | Howard | H04W 28/0289 370/235 |
| 2015/0066557 A1* | 3/2015 | Lichti | G06Q 10/06311 705/34 |

* cited by examiner

NON-INTRUSIVE IT DEVICE MONITORING AND PERFORMING ACTION BASED ON IT DEVICE STATE

CROSS-REFERENCE TO RELATED APPLICATIONS

This application is a continuation of U.S. patent application Ser. No. 14/947,834 filed Nov. 20, 2015, which claims the benefit of U.S. Provisional Application No. 62/083,622, filed Nov. 24, 2014, which are all hereby incorporated by reference in their entirety.

BACKGROUND

In data centers, the inherently dynamic inventory changes of Information Technology ("IT") devices (e.g. virtual in combination with physical and software in combination with physical: compute nodes, networking nodes, storage nodes, power nodes, and cooling nodes) may create a data center environment in which significant overhead in tracking and enforcing IT device state may exist (e.g. new session established to IT devices or changes on existing IT device session state). Some of the various techniques to work around tracking problem(s) may require: (1) installing software agents on an IT device's Operating System ("OS"); (2) scanning and inquiring state of IT devices on a whole network; and (3) checking IT devices for possible state changes.

Additionally, various IT devices, such as IT devices by various vendors, may have different network protocols, user interfaces and APIs, which may increase the difficulty of communicating with IT device(s) and reporting IT device state(s).

Finally when the information about the state of the IT device(s) under monitoring is known, an action may be required to bring the IT device state(s) to a desirable new state or revalidate the current state in order to enforce compliance and/or security needs of the data center.

DETAILED DESCRIPTION

Some of the various embodiments of the present invention relate to infrastructure management systems, and more particularly to data center infrastructure management device(s) configured to process network communication of data center component(s). Various embodiments relate to a data center infrastructure configured to process network communication from data center component(s) (e.g. IT devices) and use the state of the device to determine an action to be performed on data center component(s) in an infrastructure management system.

A device is a machine or component that attaches to a computer and/or computer network. Examples of devices include disk drives, printers, displays, mice, and modems. These particular devices may fall into a category of peripheral devices separate from a main computing device. Other example devices may be non-peripheral devices such as IT devices. Many devices, whether peripheral or not, may employ a program called a device driver that acts as a translator, converting general commands from an application into specific commands that the device understands.

An IT device is an "Information Technology" device related to computing technology, comprising, but not limited to: data center devices, networking devices, hardware devices, software operating in combination with a hardware IT device, Internet devices, and/or the like. Some IT devices may employ virtual devices operating on specially configured hardware. Additional examples of IT devices include compute nodes, networking nodes, storage nodes, power nodes, cooling nodes, combinations thereof, and/or the like.

A virtual device may employ a software virtual device driver operating on a hardware computing device configured to emulate hardware and other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware or external software resources. Some example virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

An agent may comprise a computer program that acts for a user or other program in a relationship of agency, which derives from the Latin agere (to do): an agreement to act on one's behalf. Such "action on behalf of" implies the authority to decide which, if any, action is appropriate. Some agents may comprise, but are not limited to: intelligent agents (in particular exhibiting some aspect of artificial intelligence, such as learning and reasoning), autonomous agents (capable of modifying the way in which the agent achieves objectives), distributed agents (being executed on physically distinct computers), multi-agent systems (distributed agents that do not have the capabilities to achieve an objective alone and thus must communicate), and mobile agents (agents that can relocate their execution onto different processors).

Some of the various embodiments monitor virtual (in combination with configured computing hardware) and/or physical IT devices such as compute nodes, networking nodes, storage nodes, power nodes, cooling nodes, other IT devices, combinations thereof, and/or the like. An infrastructure management system may automatically perform an action on IT device(s)—based at least in part, by an IT device state.

The nature of the interaction between infrastructure management system(s) and IT device(s) may be regulated by the type of device itself to dictate network protocols natively supported by the IT device(s). The type of IT device(s) may also be used to identify a class or type of monitoring that may apply for IT device(s) available in a network.

Figure 1A:
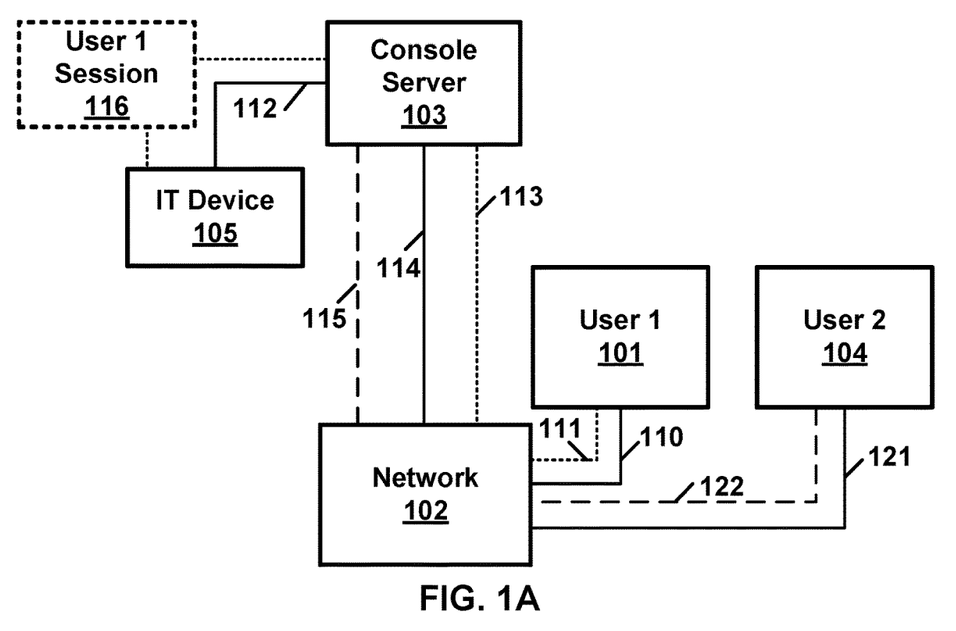
FIG. 1A is a block diagram showing example components that may be involved in a device communication over the network where the state of the previous communication session may affect the state of the next communication session of a device in a data center according to some of the various embodiments of the present invention.
Figure 1B:
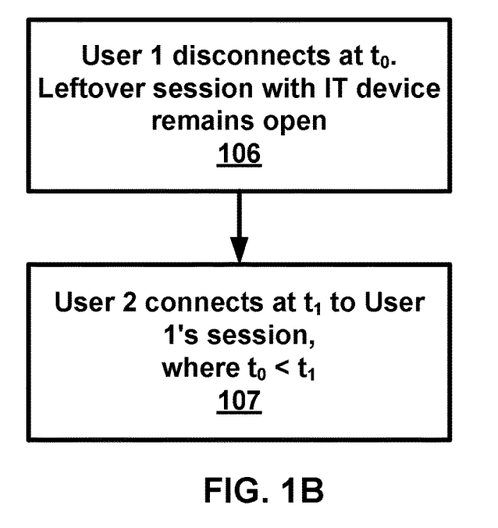
FIG. 1B is a flow diagram showing example actions with respect to the components in FIG. 1A according to some of the various embodiments of the present invention.

FIG. 1A is a block diagram showing example components that may be involved in device communication over a network where the state of the previous communication session may affect the state of the next communication session of a device in a data center according to some of the various embodiments of the present invention. FIG. 1B is a flow diagram showing example actions with respect to the components in FIG. 1A.

With reference to FIG. 1A, a user 1 101 connected to a network 102 via a network media 110 may establish a network session (e.g. console session) over a network connection link 111 and/or 113 to a server 103 (e.g. console server, control server, concentrator, and/or the like) via network media 114. The server 103 may further connect user 1 to IT device 105 via a port 112 (e.g. a serial console port) establishing a user 1 session 116. Under some circumstances that may vary according to the configuration of the network components involved in the connection, one or more network component(s) of this network session may decide to disconnect. For example, but not limited to: the workstation used by user 1 101, the network connection 111 and/or 113, the network 102, the server 103, a combination thereof, and/or the like may decide to disconnect user 1's session 116. It is possible that in such a scenario, user 1 session 116 to IT device 105 via serial port 112 may remain established as a leftover session regardless of the disconnection on server 103, network 102, network connection 111 and/or 113 and/or workstation used by user 1 101. A user 2 104 connected to a network 102 via a network media 121 may start a network console session over a network connection link 122 and 115 to server 103 via a network media 114 and may find open and available user 1's leftover session 116 with IT device 105 via port 112, impersonating the identification of user 1 101.

Therefore, as illustrated in FIG. 1B, at 106, a user 1 may disconnect at time to and may leave behind an open leftover session with the IT device 105. At 107, a user 2 may connect at time t1 to the same IT device 105 and may find user 1's leftover session 116 still open. This example scenario may expose a security breach on IT device(s) in the data center. The session state of the previous user with the IT device 105 may have incorrectly been given to following user(s) of IT device 105 without proper validation.

Figure 2A:
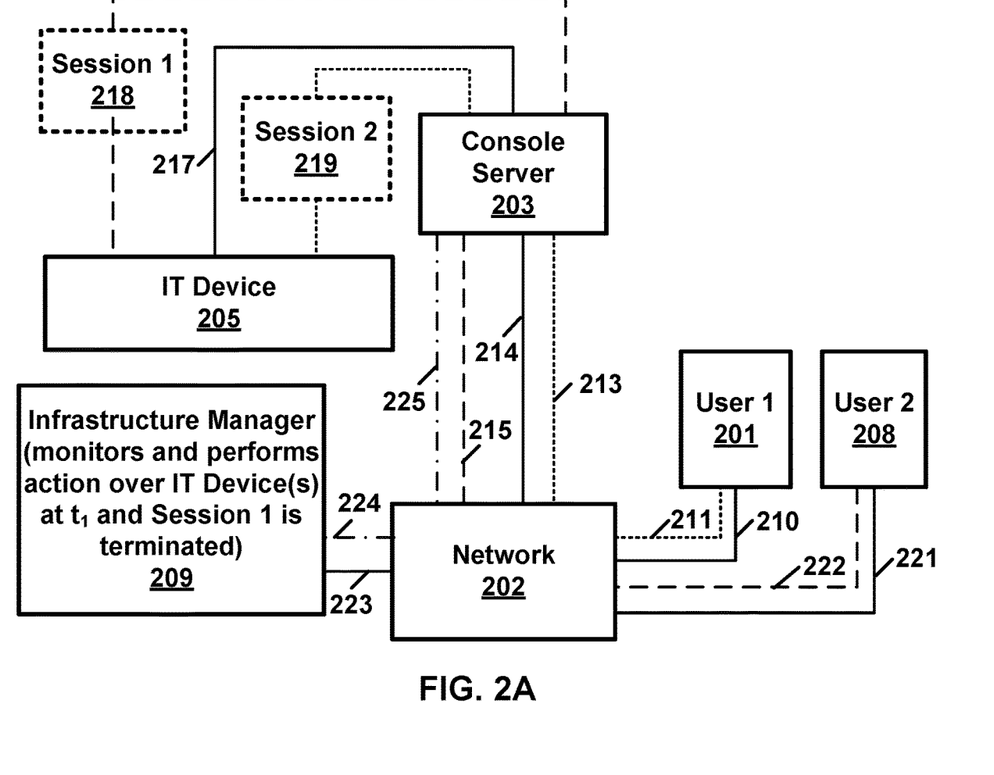
FIG. 2A is a block diagram showing example components that may be involved in a device communication over a network where the infrastructure management may monitor the state of the previous communication session and may perform an action that may change the status of the next communication session of a device in a data center according to some of the various embodiments of the present invention.
Figure 2B:
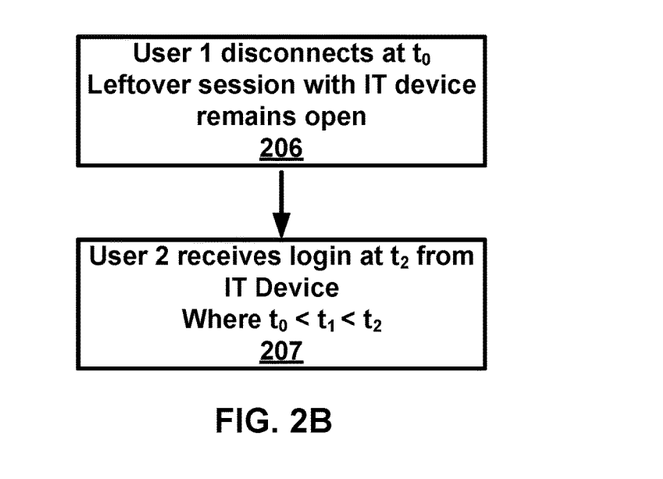
FIG. 2B is a flow diagram showing example actions with respect to the components in FIG. 2A according to some of the various embodiments of the present invention.

FIG. 2A is a block diagram showing example components that may be involved in a device communication over the network where the infrastructure management may monitor the state of the previous communication session and may perform an action that may change the status of the next communication session of a device in a data center according to some of the various embodiments of the present invention. FIG. 2B is a flow diagram showing example actions with respect to the components in FIG. 2A.

With reference to FIG. 2A, user 1 201 connected to a network 202 via a network media 210 may establish a network session (e.g. a network console session) over network connection link 211 and 213 to server 203 (e.g. console server) via a network media 214. Server 203 may further connect user 1 to IT device 205 via a port 217 (e.g. serial console port), establishing session 1 218. Under some circumstances that may vary according to the configuration of the network components involved in the connection, at least one network component of this session may decide to disconnect. For example, but not limited to: the workstation used by user 1 201, the network connection 211 and/or 213, the network 202, the server 203, a combination thereof, and/or the like may decide to disconnect user 1's session. It is possible that in this example scenario, session 1 218 to IT device 205 via port 217 remains established as a leftover session regardless of the disconnection on console server 203, network 202, network connection 211 and/or 213 and/or workstation used by user 1 201. On the disconnection, it may also be possible that one of the network components 203, 202, 201, a combination thereof, and/or the like may decide to generate a message about the disconnection. For example, but not limited to, server 203 may generate a SNMP trap, a SYSLOG message or other monitored information to the infrastructure manager 209, connected to network 202 via a network media 223 and/or network connection link 224 and/or 225, which may be used to determine the state of IT device(s). Infrastructure manager 209 may be provided as an application within console server 203. Alternatively, infrastructure manager 209 may be provided on another device.

The state of the IT device(s) may be used to decide to perform an action over one of components 203, 202, 201, a combination thereof, and/or the like. For example, but not limited to: the infrastructure manager 209 may perform an action on server 203 in order to close port 217 and/or leftover session 1 218 originally established by user 1. A user 2 208 connected to a network 202 via a network media 221 may start a network console session over a network connection link 222 and/or 215 to console server 203 via a network media 214 and may no longer find an open leftover session 1 218 or a connection establish with serial console port 217 from user 1. Instead, user 2 may have to establish a new port session 2 219 (e.g. serial console port session) with server 205 via port 217, which may eliminate the impersonation of the previous user's identification.

Therefore, as illustrated in FIG. 2B, a user 1 201 may disconnect at time to and may leave behind an open leftover session with the IT device 205 at 206. At time t1, the Infrastructure Manager 209 may detect a status change and may perform an action on server 203 in order to close port 217 and/or session 1 218. A user 2 may connect at time t2 to the same IT device 205 and may no longer find user 1 session 218 still open and may rather receive login prompt from IT device 205 at 207. This scenario may correct a security breach on IT device(s) in the data center. With the intervention of the infrastructure manager 209, the session state of the previous user with the IT device 205 may no longer be incorrectly given to the following user of the IT device 205 and the serial console port 217 may require proper validation onwards.

Figure 3:
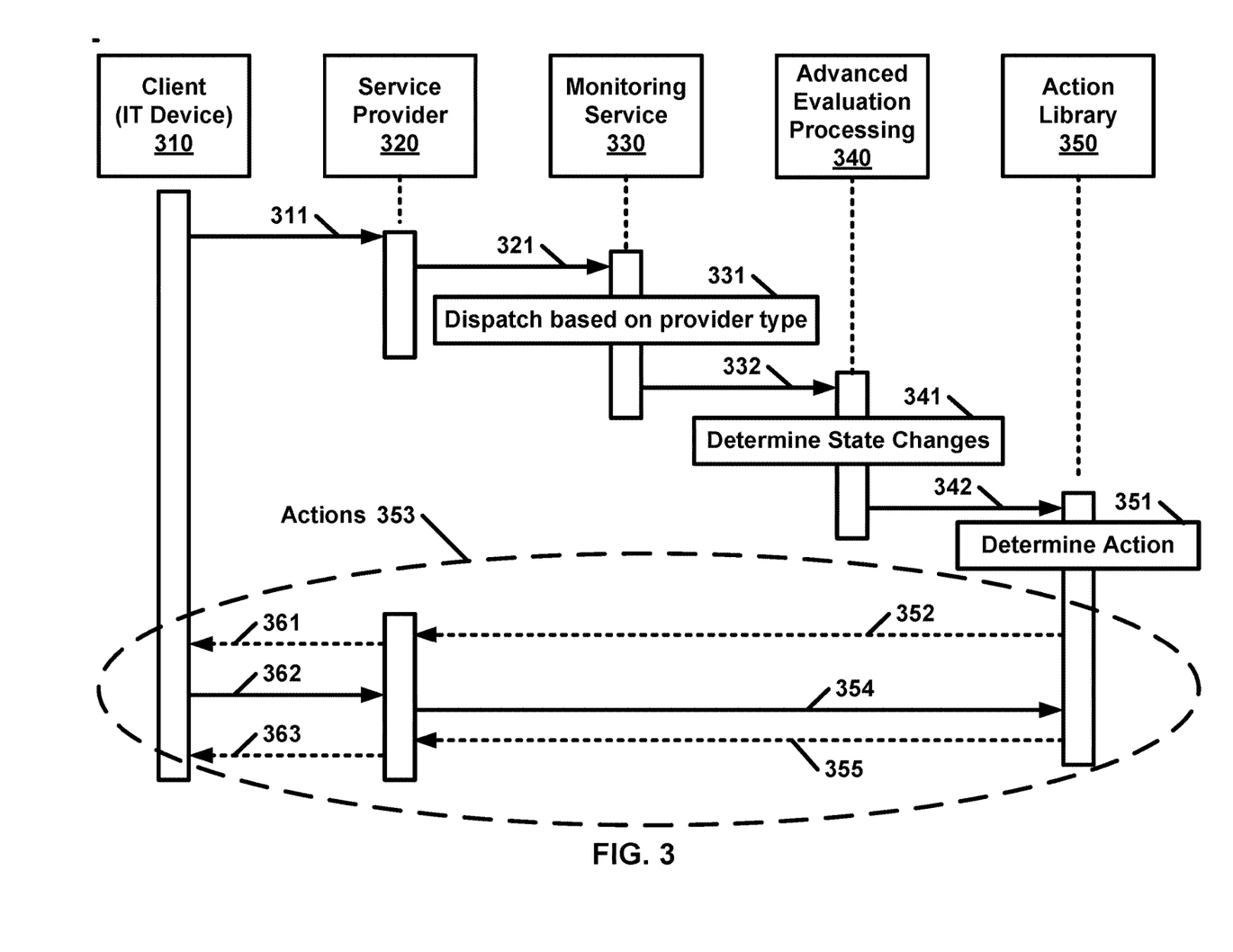
FIG. 3 is an example flow diagram illustrating one of the various techniques for the monitoring of an IT device communicating with an infrastructure management system according to some of the various embodiments of the present invention

FIG. 3 is an example flow diagram illustrating one of the various techniques for monitoring of IT device(s) communicating with the infrastructure management system according to some of the various embodiments of the present invention. For example, with reference to FIG. 3, client IT device 310 may be configured to generate and communicate a monitoring message 311 to a service provider 320. Monitoring message 311 may contain information about the current IT device state of client IT device 310. The service provider 320 may be a module that understands the communication protocol, the device profile, and/or monitoring message format for IT device(s) and may be able to perform a first inspection on the monitoring message. The service provider 320 may forward the information 321 to monitoring service 330. Monitoring service 330 may receive information from multiple service providers (e.g. 320), may perform a second round of inspection which may be based on the service provider type and may dispatch, based on the provider type 331, monitoring message 332 to the advanced evaluation processing 340. Advanced evaluation processing 340 may determine state changes 341 which may be based on IT device monitoring message information. IT device monitoring message information may contain aggregated information from monitoring message 311, information 321 and/or provider type 332. Advance evaluation processing 340 may decide to forward an action request 342 to action library 350 determined, at least in part, by the state of the IT device(s). Action library 350 may determine action 351 that may be performed. As series of actions 353 may interact with IT device(s) via communication channels 352 and 361 (via service provider 320) and may receive responses 362 and 354 (via service provider 320) that may require further interaction with IT device(s) via communication channels 355 and 363 (via service provider 320) until no further perform action 353 may be required.

Figure 4:
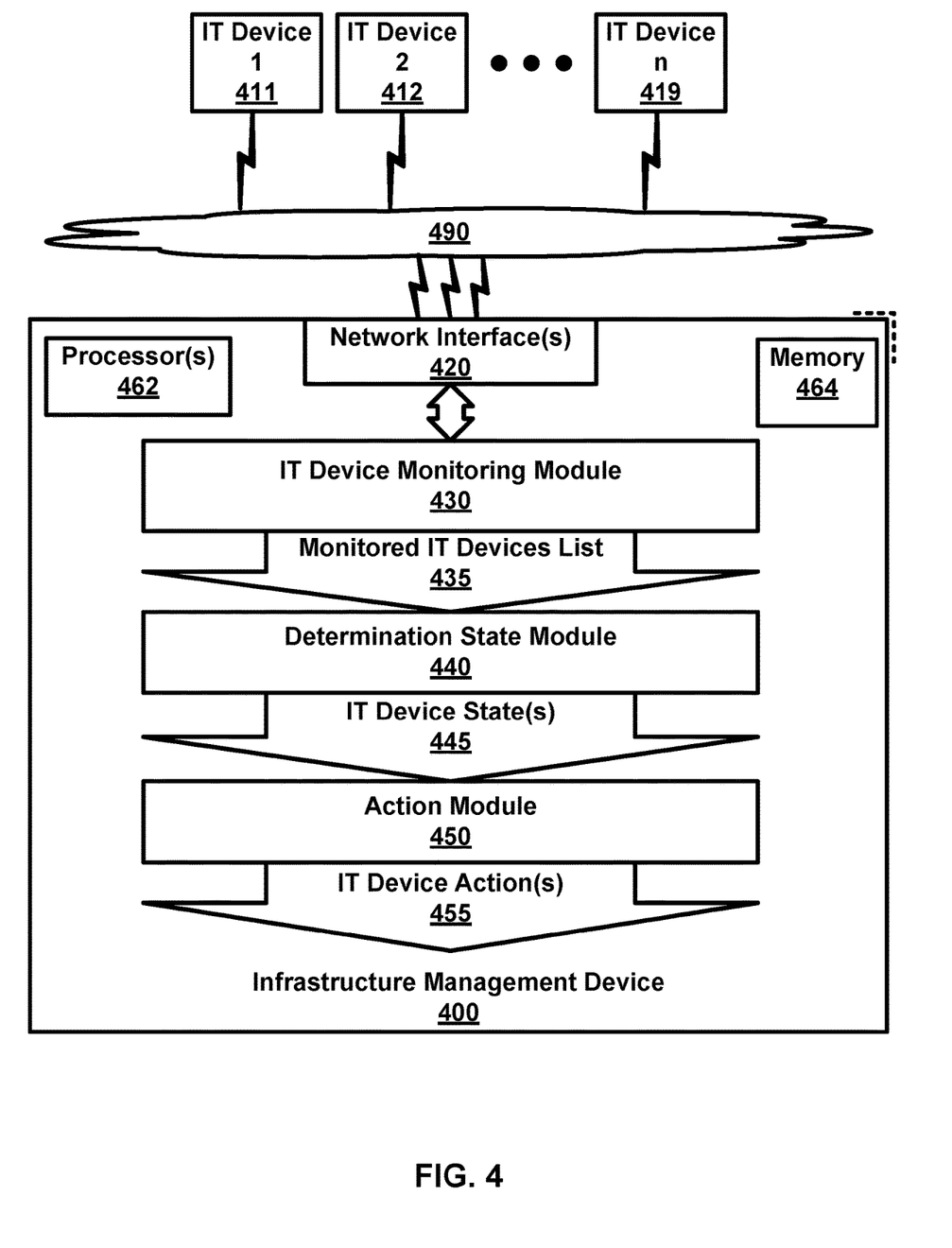
FIG. 4 is an example block diagram of an infrastructure management device according to some aspects of various embodiments of the present invention.
Figure 5:
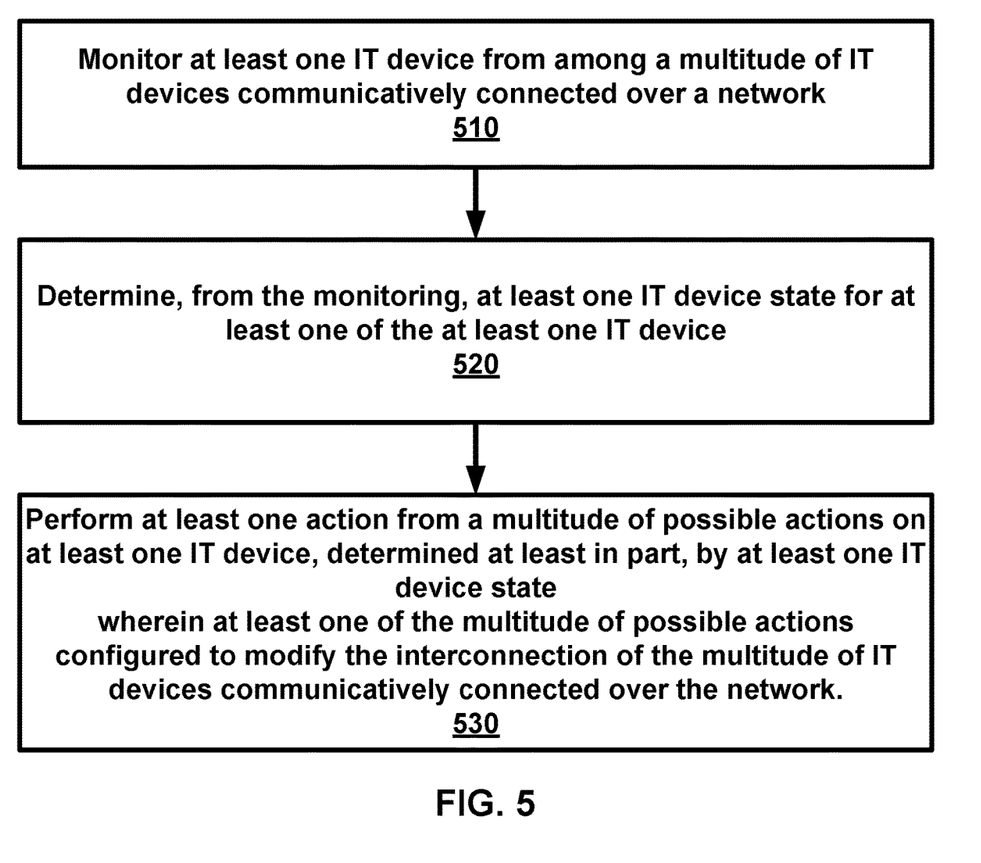
FIG. 5 is an example flow diagram of device monitoring and action according to some aspects of various embodiments of the present invention.

FIG. 4 is an example block diagram of an infrastructure management device 400 according to some aspects of various embodiments of the present invention. FIG. 5 is an example flow diagram of device monitoring, determining the state and performing an action according to some aspects of various embodiments of the present invention.

Some of the various embodiments may comprise an infrastructure management device 400. The infrastructure management device 400 may comprise at least one processor 462, memory 464, network interface(s) 420 and other supporting hardware (e.g. electronic communications busses, controllers, non-transitory tangible machine readable medium readers, and/or the like). The memory 464 may comprise a non-transitory tangible machine readable medium. The non-transitory tangible machine readable medium may comprise instructions configured to cause at least one processor 462 to perform a process of IT device discovery and configuration. According to some of the various embodiments, the non-transitory tangible machine readable medium may not comprise a transitory propagating signal. The network interface(s) 420 may be configured to communicate with a multitude of IT devices (411, 412 . . . 419) over a network 490. Network 490 may comprise, but is not limited to: the Internet, an intranet, a connection to the Internet, a private cloud, interconnected data centers, a multi-nodal network, two or more computing devices connected using a Virtual Private Network, an on-premise network, a combination thereof, and/or the like.

The infrastructure management device 400 may comprise a multitude of infrastructure management devices 400 configured to cooperatively operate together. Examples of an infrastructure management device 400 may comprise, but are not limited to: a server, a compute node, a router, a switch, a firewall, a load balancer, a networking node, a storage node, a power node, a cooling node, a network appliance, a virtual appliance, system hardware with network access, a hosted module within a system, and/or the like. According to some of the various embodiments, infrastructure management device(s) may comprise a virtual machine running on a hardware computing device and acting as at least one of the following: a server, a compute node, a router, a switch, a firewall, a load balancer, a networking node, a storage node, a power node, a cooling node, a network appliance, a virtual appliance, system hardware with network access, a hosted module within a system, and/or the like.

According to some of the various embodiments, IT device(s) (411, 412 . . . 419) may comprise at least one of the following: a server, a compute node, a router, a switch, a firewall, a load balancer, a networking node, a storage node, a power node, a cooling node, a network appliance, a virtual appliance, system hardware with network access, a hosted module within a system, a combination thereof, and/or the like.

At least one IT device may be monitored from among a multitude of IT devices (411, 412 . . . 419) communicatively connected over a network 490 at block 510. This monitoring may be performed by, for example, an IT device monitoring module 430. The monitored IT devices may be enumerated in a monitored IT devices list 435. The IT devices in the monitored IT devices list 435 may be part of an IT devices inventory. The monitoring of IT device(s) (e.g. (411, 412 . . . and/or 419) may be performed in numerous ways according to various embodiments. For example, an IT device may be monitored by making configuration changes on at least one IT device, listening to a communication from the at least one IT device, listening to an DHCP request from the at least one IT device, interacting with a communications processor associated with at least one IT device, interacting with a communications processor disposed within at least one IT device, interacting with a virtual machine hypervisor, interacting with a console server, interacting with a terminal server, interacting with an agent, interacting with a Configuration Management Database (CMDB) system, interacting with a data store system, interacting with another infrastructure management device, listening to a syslog message, listening to an event message, listening to a SNMP trap, a combination of the above, and/or the like.

Monitoring may define classes of communication methods, protocols and process used to monitor the IT devices connected over a network. Monitoring may also, according to some of the various embodiments, be employed to identify possible mechanisms to interact back with IT device(s).

Monitoring may comprise determining if another of the multitude of IT devices (411, 412 . . . 419) operates using a similar protocol. A protocol may comprise a system of digital rules for the exchange of data within or between computers. The rules may define format(s) for exchanging messages where some messages are configured to elicit a response from a range of possible responses pre-determined for that particular situation. A protocol may define the syntax, semantics, and synchronization of communication. Some specified behaviors may be independent of how an interface is implemented. A protocol may be implemented as hardware, software, and/or a combination of hardware and software. Software may comprise embedded firmware. Some of the various communications protocols may be implemented according to one or more technical standards from organizations such as, but not limited to, the International Organization for Standardization (ISO), the International Telecommunications Union (ITU), the Institute of Electrical and Electronics Engineers (IEEE), and the Internet Engineering Task Force (IETF).

Monitoring, according to some of the various embodiments, may further comprise determining if another of the multitude of IT devices (411, 412 . . . 419) operates using a similar communication profile. Yet other monitoring may comprise determining if another of the multitude of IT devices are the same class of IT device.

IT device state(s) for IT device(s) may be determined from the monitoring at block 520. IT device state(s) 445 may be determined by, for example, determination state module 440. IT device state(s) 445 may comprise a set of data associated IT device(s) that enables characteristics of the IT device(s) which may be useful for IT device classification, interaction and/or action to be determined. IT device state(s) 445 may comprise, but are not limited to, at least one of the following: an IT device power state (examples comprise, but are not limited to: on, off, suspend, reboot, cycle, shutdown), an IT device console session state (examples, comprise, but are not limited to, established, disconnected, terminated, open, close, in-use, timed-out, expired, login, logout), an IT device login credential state (examples comprise, but are not limited to: expired, incorrect user, incorrect password, locked, valid, invalid), an IT device configuration state (examples comprise, but are not limited to: modified, unmodified, preserved, saved, applied, restored, outdated, current, version), an IT device Operating System (OS) or firmware state (examples comprise, but are not limited to: updated, running, suspended, block, locked, hibernating, version), an IT device hosted application state (examples comprise, but are not limited to: running, on, off, suspend, in-progress, in-use, wait, stop, version), an IT device network state (examples comprise, but are not limited to: up, down, disconnected, unavailable), an IT device hardware state (examples comprise, but are not limited to: on, off, rebooting), an IT device environmental state (examples comprise, but are not limited to: CPU temperature, fan speed, fan state, enclosure open/close) an IT device logical state, an IT device physical state, a combination thereof, and/or the like.

At block 530, at least one action may be performed from a multitude of possible actions on at least one IT device, determined at least in part, by at least one IT device state. At least one of the multitude of possible actions may be configured to modify the interconnection of the multitude of IT devices communicatively connected over the network. The device action(s) 455 may be performed by, for example, an action module 450. An action is an operation executed based on the evaluation of a state. Examples of IT device action(s) 455 may comprise, but are not limited to: comparing IT device states, comparing IT device states changes, executing user defined commands, scripts and/or programs over the network on IT device(s), executing user defined commands, scripts and/or programs locally and/or over the network on infrastructure manager device(s), executing pre-defined commands, scripts and/or programs over the network on IT device(s), executing pre-defined commands, scripts and/or programs locally and/or over the network on infrastructure manager device(s), communicating with at least one IT device in order to verify device IT state and cause change on device IT state, a combination thereof, and/or the like. According to some of the various embodiments, performing IT device action(s) 455 may comprise, but are not limited to: comparing IT device states, comparing IT device states changes, executing user defined commands, scripts and/or programs over the network on IT device(s), executing user defined commands, scripts and/or programs locally and/or over the network on infrastructure manager device(s), executing pre-defined commands, scripts and/or programs over the network on IT device(s), executing pre-defined commands, scripts and/or programs locally and/or over the network on infrastructure manager device(s), communicating with at least one IT device in order to verify device IT state and cause change on device IT state, a combination thereof, and/or the like.

Some of the various embodiments relate to enabling communication with and/or between various IT devices, for example, from multiple vendors through standardized interactions. The various IT devices may comprise, but are not limited to: virtual devices operating on configured hardware computing devices and/or physical computing devices.

Figure 6:
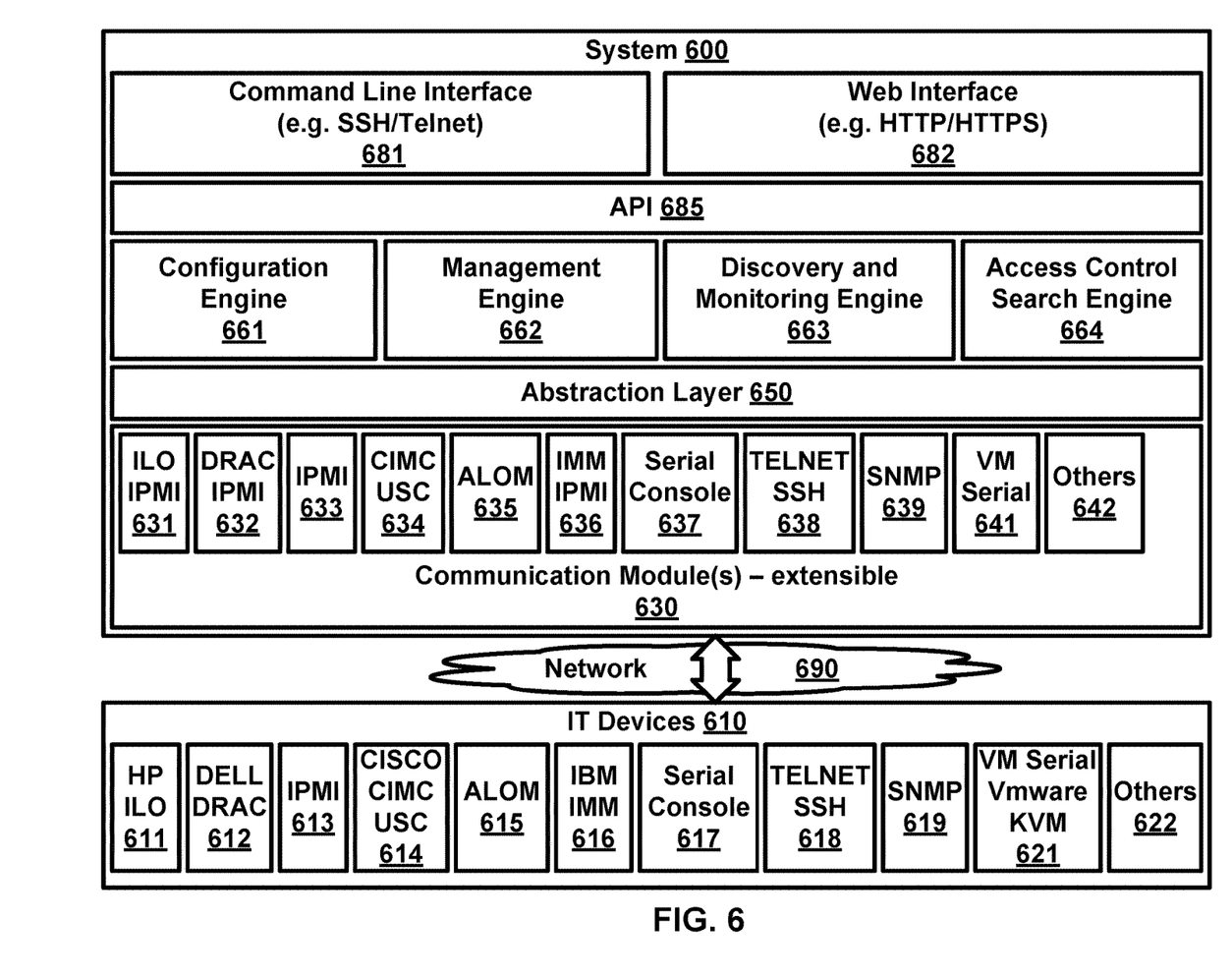
FIG. 6 is a block diagram showing an example architecture comprising components employed to enable standardized interactions with heterogeneous information technology devices from various vendors according to some aspects of various embodiments of the present invention.

FIG. 6 is a block diagram showing an example architecture comprising various components employed to enable standardized interactions with heterogeneous information technology devices from various vendors according to some aspects of various embodiments of the present invention. The vendor-neutral system 600 for enabling standardized interaction with IT devices 610 of various types and from multiple vendors presented in FIG. 6 shows a set of extensible communications modules 630 that may communicate with the IT devices 610 over network 690. These IT devices 610 may comprise physical and/or virtual nodes (e.g. compute nodes, networking nodes, storage nodes, power nodes, cooling nodes, and/or the like) and they may request connection and configuration and/or be polled via network protocols once they are powered on, and/or on a periodic basis, according to their protocol specifications. Information in IT device requests may be collected by the Discovery and Monitoring Engine 663 and treated as the Personality Identification(s) of some or all of IT device(s) 610 in order to automatically add those IT device(s) 610 into the system 600. Alternatively, an IT device (e.g. 611 through 622) may also be added via Configuration Engine 661 by providing the IT device Personality Identification associated with an IT device (e.g. 611 through 622) manually via a Command Line interface 681; Web interface 682 or programmatically via an Application Programmable Interface (API) 685. IT devices (e.g. 611 through 622), which may be from single or multiple vendors (possibly with different protocols, user interfaces and features), added to the system 600 may be available for interaction. Access-Control-Search Engine 664 and Management Engine 662 may be configured to be responsible for enabling interaction with the IT devices 610 via Abstraction Layer 650. Abstraction Layer 650 (which may be responsible for the dictionary and translation between the engines and different protocols) may provide a foundation for the normalization of the interaction and allow extensibility via the extensible communication modules 630.

According to FIG. 6, interactions with IT devices 610 may be performed via extensible communication module(s) 630. Extensible communication module(s) 630 may understand the particularities of the IT device type with which it interacts. Examples modules that implement protocols and services may comprise, by are not limited to: IPMI 633 for generic vendors, CIMC 634 for Cisco devices, DRAC 632 for Dell devices, ILO 631 for HP devices, IMM 636 for IBM devices, ALOM 635 for Oracle devices, Telnet/SSH 638 for generic devices, serial console port 637, VM serial 641 for VMware devices such as VM/Mouse—Keyboard—Screen (MKS) and Virtual Serial for keyboard—Video—Mouse (KVM) and SNMP 639, others 642 that may be extended, combinations thereof, and/or the like. Information exchanged with IT devices 610 and access/interaction mechanism(s) may vary according to the IT device type. Access/interaction and associated complex information, which may have for example mouse-keyboard-screen data, serial console data, event data, and environment data among others, may be presented in a normalized manner to a user (or device) via Web, Command Line and API interfaces for IT devices handled by the system in order to provide a common user experience irrespective of IT device characteristics. For example (but not limited to), a command like "power off", which may be available on a unified common user interface of the system for a given IT device, may be translated by Abstraction Layer 650 in specific instructions according to the profile of the IT device. A system administrator may not be required to have knowledge of the particular parameters required to execute the action regardless if the action is being carried out on an IPMI server 613, Dell DRAC server 612, ALOM server 615, IBM IMM server 616, Cisco CIMC server 614, HP ILO server 611, SNMP 619, VMware VM and/or KVM VM 621 or other IT device 622 controlled by the system, including devices communicating over serial console port 617, a Telnet and/or SSH port 618, a combination thereof, and/or the like.

With respect to the action performed by 530, for example, a pre-defined command like "power off" may be included in a script and/or program to be executed as part of a set of actions taken by the infrastructure management in response to an IT device console session state like "disconnected." The extensible communication module(s) 630 may provide the means to communicate with the IT device in order to determine the state change and carry out the execution of the command "power off" on the IT device regardless of the IT device type enrolled in the infrastructure management. In another example, the IT device may report a firmware version state like "firmware version 1.2", which may require a complex set of actions performed by a user defined command such as "firmware upgrade" implemented via a custom script residing on one or more of the IT device(s) in the network. The custom script may make use of the abstraction provided by the extensible communication module(s) 630 in order to carry out multiple actions like upgrading firmware on the IT device follow by a "power reboot."

Figure 7:
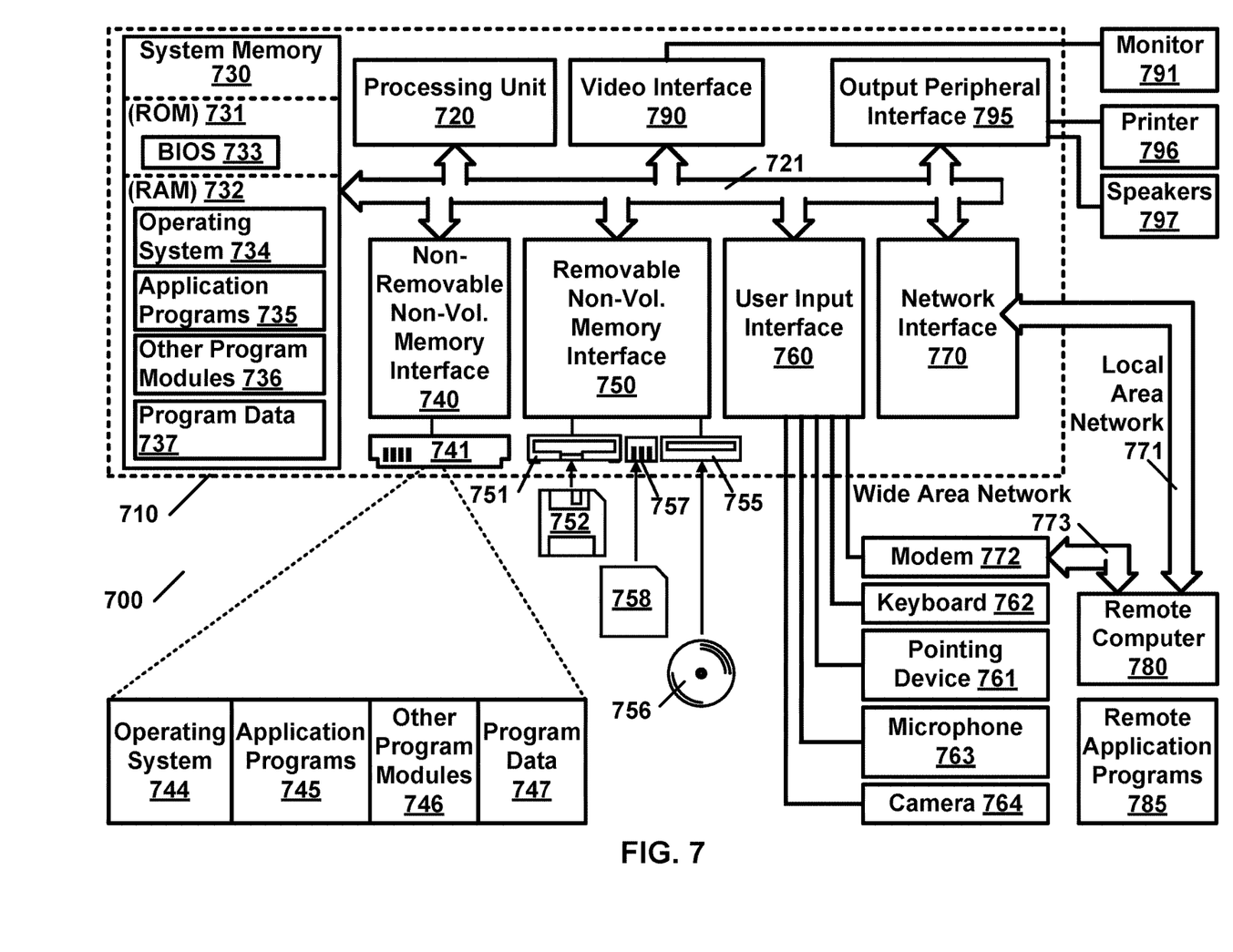
FIG. 7 illustrates an example of a suitable computing system environment on which aspects of some embodiments may be implemented.

FIG. 7 illustrates an example of a suitable computing system environment 700 on which aspects of some embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, hand-held or laptop devices, multiprocessor systems, microprocessor-based systems, set top boxes, programmable consumer electronics, network PCs, minicomputers, mainframe computers, cloud services, telephony systems, distributed computing environments that include any of the above systems or devices, and the like.

Embodiments may be described in the general context of computer-executable instructions, such as program modules, being executed by computing capable devices. Generally, program modules include routines, programs, objects, components, data structures, etc. that perform particular tasks or implement particular abstract data types. Some embodiments may be designed to be practiced in distributed computing environments where tasks are performed by remote processing devices that are linked through a communications network. In a distributed computing environment, program modules may be located in both local and remote computer storage media including memory storage devices.

With reference to FIG. 7, an example system for implementing some embodiments includes a computing device 710. Components of computer 710 may include, but are not limited to, a processing unit 720, a system memory 730, and a system bus 721 that couples various system components including the system memory to the processing unit 720.

Computer 710 typically includes a variety of computer readable media. Computer readable media can be any available media that can be accessed by computer 710 and includes both volatile and nonvolatile media, and removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

The system memory 730 includes computer storage media in the form of volatile and/or nonvolatile memory such as ROM 731 and RAM 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, a flash drive reader 757 that reads flash drive 758, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7 provide storage of computer readable instructions, data structures, program modules and other data for the computer 710. In FIG. 7, for example, hard disk drive 741 is illustrated as storing operating system 744, application programs 745, program data 747, and other program modules 746. Additionally, for example, non-volatile memory may include instructions to, for example, discover and configure IT device(s); the creation of device neutral user interface command(s); combinations thereof, and/or the like.

A user may enter commands and information into the computer 710 through input devices such as a keyboard 762, a microphone 763, a camera 764, and a pointing device 761, such as a mouse, trackball or touch pad. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device may also connected to the system bus 721 via an interface, such as a video interface 790. Other devices, such as, for example, speakers 797 and printer 796 may be connected to the system via peripheral interface 795.

The computer 710 may be operated in a networked environment using logical connections to one or more remote computers, such as a remote computer 780. The remote computer 780 may be a personal computer, a handheld device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. The modem 772 may be wired or wireless. Examples of wireless devices may comprise, but are limited to: Wi-Fi and Bluetooth. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used. Additionally, for example, LAN 771 and WAN 773 may provide a network interface to communicate with other distributed infrastructure management device(s); with IT device(s); with users remotely accessing the User Input Interface 760; combinations thereof, and/or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded systems, machines a combination thereof, and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: magnetic disks, cards, tapes, and drums, flash memory, memory cards, electrically erasable programmable read-only memory (EEPROM), solid state drives, optical disks, barcodes, magnetic ink characters, a combination thereof, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. One or more non-transitory tangible machine readable media comprising instructions configured to cause at least one processor on at least one infrastructure management device to perform a process comprising:
   a) monitoring at least one Information Technology ("IT") device of a data center which is physically connected to a console server;
   b) determining, from the monitoring the at least one IT device, at least one IT device state indicating
      i) a first user's connection session to the at least one IT device by a first physical console port of the console server via at least one network component, the first user's connection disconnects after the first user's connection session is established with the at least one IT device over the at least one network component, and
      ii) the first user's connection session with the at least one first IT device via the first physical port of the console server remains open as a leftover session even after the first user's connection session disconnects, wherein the leftover session contains user identification information of the first user, and
   wherein
      the determining the at least one IT device state is based on a message generated by the at least one network component about the disconnecting of the first user's connection, and
      the at least one processor is further configured to perform at least two actions from a multitude of possible actions on the at least one IT device, determined at least in part, by the at least one IT device state, and
      wherein at least two actions comprise least the following,
         comparing at least two of the at least one IT device state, and
         comparing at least one IT device state change; and
   c) closing the first physical console port of the console server, in response to determining the at least one IT device state, to terminate the leftover session of the first user before a second user's connection session to the first at least one IT device via the first physical console port is started; and
   preventing a security breach on the at least one IT device by preventing the second user from impersonating the identification of the first user.

2. The one or more non-transitory tangible machine readable media according to claim 1, wherein the leftover session comprises a serial console port session.

3. The one or more non-transitory tangible machine readable media according to claim 1 wherein the at least one network component comprises a workstation used by the first user, a network connection, a network, a server, or a combination thereof.

4. The one or more non-transitory tangible machine readable media according to claim 1, wherein the monitoring further comprises monitoring the at least one IT device for at least one or more of the following:
   a) configuration changes;
   b) a communication from at least one other IT device;
   c) listening to an DHCP request from the at least one other IT device;
   d) interacting with a communications processor associated with the at least one IT device;
   e) interacting with a communications processor disposed within the at least one IT device;
   f) interacting with a virtual machine hypervisor;
   g) interacting with a console server;
   h) interacting with a terminal server;
   i) interacting with an agent;
   j) interacting with a Configuration Management Database system;
   k) interacting with a data store system;
   l) interacting with another infrastructure management device;
   m) listening to a syslog message;
   n) listening to an event message;
   o) Listening to a SNMP trap; or
   p) a combination of the above.

5. The one or more non-transitory tangible machine readable media according to claim 1, wherein the at least one IT device comprises at least one or more of the following:
   a) a server;
   b) a compute node;
   c) a router;
   d) a switch;
   e) a firewall;
   f) a load balancer;
   g) a networking node;
   h) a storage node;
   i) a power node;
   j) a cooling node;
   k) a network appliance;
   l) a virtual appliance;

m) system hardware with network access; or
n) a hosted module within a system.

6. The one or more non-transitory tangible machine readable media according to claim 1, wherein the at least one IT device comprises at least two or more of the following:
   a) a server;
   b) a compute node;
   c) a router;
   d) a switch;
   e) a firewall;
   f) a load balancer;
   g) a networking node;
   h) a storage node;
   i) a power node;
   j) a cooling node;
   k) a network appliance;
   l) a virtual appliance;
   m) system hardware with network access; or
   n) a hosted module within a system.

7. The one or more non-transitory tangible machine readable media according to claim 1, wherein the at least one IT device state comprises one or more of the following:
   a) an IT device power state;
   b) an IT device console session state;
   c) an IT device login credential state;
   d) an IT device configuration state;
   e) an IT device Operating System (OS) state;
   f) an IT device firmware state;
   g) an IT device hosted application state;
   h) an IT device network state;
   i) an IT device hardware state;
   j) an IT device environmental state;
   k) an IT device logical state; or
   l) an IT device physical state.

8. The one or more non-transitory tangible machine readable media according to claim 1, wherein the multitude of possible actions further comprises at least one or more of the following:
   a) executing at least one user defined command on the at least one IT device over the network;
   b) executing at least one user defined script on the at least one IT device over the network;
   c) executing at least one user defined program on the at least one IT device over the network;
   d) executing at least one user defined command on the at least one IT device locally;
   e) executing at least one user defined script on the at least one IT device locally;
   f) executing at least one user defined program on the at least one IT device locally;
   g) executing at least one user defined command on the at least one infrastructure management device over the network;
   h) executing at least one user defined script on the at least one infrastructure management device over the network;
   i) executing at least one user defined program on the at least one infrastructure management device over the network;
   j) executing at least one user defined command on the at least one infrastructure management device locally;
   k) executing at least one user defined script on the at least one infrastructure management device locally; or
   l) executing at least one user defined program on the at least one infrastructure management device locally.

9. The one or more non-transitory tangible machine readable media according to claim 1, wherein the multitude of possible actions comprises at least one or more of the following:
   a) communicating with the at least one IT device in order to verify an IT device state; or
   b) communicating with the at least one IT device in order to cause a change of the IT device state.

10. The device according to claim 1, wherein the multitude of possible actions further comprises the following:
    a) communicating with the at least one IT device in order to verify an IT device state; or
    b) communicating with the at least one IT device in order to cause a change of the IT device state.

11. The one or more non-transitory tangible machine readable media according to claim 1, wherein the first physical port comprises a first serial port.

12. An infrastructure management device comprising:
    a) at least one processor;
    b) a memory;
    c) at least one network interface that communicates with a multitude of Information Technology ("IT") devices connected to a console server over a network;
    d) an IT device monitoring module that monitors at least a first IT device from among the multitude of IT devices communicatively connected over a network; and
    e) wherein the memory comprises computer instructions configured to cause the at least one processor to perform
       monitoring at least one Information Technology ("IT") device of a data center which is physically connected to a console server,
       determining, from the monitoring the at least one IT device, at least one IT device state indicating
          i) a first user's connection session to the at least one IT device by a first physical console port of the console server via at least one network component, the first user's connection disconnects after the first user's connection session is established with the at least one IT device over the at least one network component, and
          ii) the first user's connection session with the at least one first IT device via the first physical port of the console server remains open as a leftover session even after the first user's connection session disconnects, wherein the leftover session contains user identification information of the first user, and
       wherein
          the determining the at least one IT device state is based on a message generated by the at least one network component about the disconnecting of the first user's connection, and
          the at least one processor is further configured to perform at least two actions from a multitude of possible actions on the at least one IT device, determined at least in part, by the at least one IT device state, and
          wherein at least two actions comprises least the following,
             comparing at least two of the at least one IT device state, and
             comparing at least one IT device state change; and
          closing the first physical console port of the console server, in response to determining the at least one IT device state, to terminate the leftover session of the first user before a second user's connection session to the first at least one IT device via the first physical console port is started; and preventing a security breach on the at least one IT device by preventing the second user from impersonating the identification of the first user.

13. The device according to claim 12, wherein at least one or more of the following run under a virtual machine on the infrastructure management device: the IT device monitoring module, a determination state module, and a action module.

14. The device according to claim 12, wherein the IT device monitoring module further monitors the at least one IT device for at least one or more of the following:
 a) configuration changes;
 b) a communication from at least one other IT device;
 c) listening to an DHCP request from the at least one other IT device;
 d) interacting with a communications processor associated with the at least one IT device;
 e) interacting with a communications processor disposed within the at least one IT device;
 f) interacting with a virtual machine hypervisor;
 g) interacting with a console server;
 h) interacting with a terminal server;
 i) interacting with an agent;
 j) interacting with a Configuration Management Database system;
 k) interacting with a data store system;
 l) interacting with another infrastructure management device;
 m) listening to a syslog message;
 n) listening to an event message;
 o) Listening to a SNMP trap; or
 p) a combination of the above.

15. The device according to claim 12, wherein the IT device state comprises at least one or more of the following:
 a) an IT device power state;
 b) an IT device console session state;
 c) an IT device login credential state;
 d) an IT device configuration state;
 e) an IT device Operating System (OS) state;
 f) an IT device firmware state;
 g) an IT device hosted application state;
 h) an IT device network state;
 i) an IT device hardware state;
 j) an IT device environmental state;
 k) an IT device logical state; or
 l) an IT device physical state.

16. The device according to claim 12, wherein the at least one network component comprises a workstation used by the first user, a network connection, a network, a server, or a combination thereof.

17. The device according to claim 12, wherein the at first physical port comprises a first serial port.

* * * * *